(12) United States Patent
Pepper et al.

(10) Patent No.: US 11,218,379 B2
(45) Date of Patent: Jan. 4, 2022

(54) METHOD, PROCESSOR, AND SYSTEM FOR PROCESSING DATA PACKAGES

(71) Applicant: Egress Software Technologies IP Limited, London (GB)

(72) Inventors: Anthony Pepper, London (GB); Neil Larkins, London (GB); John Goodyear, London (GB); Ian Macinnes, London (GB); Hannah Clough, London (GB)

(73) Assignee: Egress Software Technologies IP Limited, London (GB)

( * ) Notice: Subject to any disclaimer, the term of this patent is extended or adjusted under 35 U.S.C. 154(b) by 0 days.

(21) Appl. No.: 17/036,029

(22) Filed: Sep. 29, 2020

(65) Prior Publication Data

US 2021/0099357 A1 Apr. 1, 2021

(30) Foreign Application Priority Data

Sep. 30, 2019 (GB) ...................... 1914090

(51) Int. Cl.
*H04L 29/08* (2006.01)
*H04L 12/24* (2006.01)

(52) U.S. Cl.
CPC ............ *H04L 41/147* (2013.01); *H04L 41/16* (2013.01); *H04L 41/5009* (2013.01)

(58) Field of Classification Search
CPC ...................................................... H04L 41/16
See application file for complete search history.

(56) References Cited

U.S. PATENT DOCUMENTS

| 9,674,132 | B1 | 6/2017 | Zhang et al. |
| 10,742,676 | B2 * | 8/2020 | Mahaffey ............ G06F 11/0709 |
| 2007/0274496 | A1 * | 11/2007 | Singh .................... H04M 3/382 |
| | | | 379/210.02 |
| 2010/0251124 | A1 | 9/2010 | Geppert et al. |
| 2014/0195933 | A1 | 7/2014 | Dv |
| 2015/0312207 | A1 | 10/2015 | Paquet et al. |
| 2015/0358265 | A1 | 12/2015 | Kaplinger et al. |
| 2016/0205052 | A1 | 7/2016 | Deluca et al. |

FOREIGN PATENT DOCUMENTS

EP 3533184 A1 9/2019

OTHER PUBLICATIONS

International Search Report and Written Opinion dated Nov. 30, 2020 for International Application No. PCT/GB2020/052352.
United Kingdom Search Report dated Mar. 17, 2020 for GB Application No. GB1914090.4.

\* cited by examiner

*Primary Examiner* — Adnan M Mirza
(74) *Attorney, Agent, or Firm* — EIP US LLP

(57) ABSTRACT

A method for processing a data package to be sent using an application, by an originator of the data package to at least one recipient, the data package having an associated mode of communication, the method comprising the steps of analysing the data package to determine content of at least one field of the data package. The method also comprises the step of generating a characteristic of the data package, wherein the characteristic is based on the mode of communication and the content of the at least one field of the data package; and an incorrect action by the originator of the data package based on the characteristic is determined.

12 Claims, 4 Drawing Sheets

400

```
...
{"identifier" : "a@b.com",
 "allowable" : {
            "pattern" :  "[Ll]ondon | [Ss]heffield | [Tt]oronto",
            "name" : "Cities"
     },
     {
            "pattern" : "API | Patents | Client",
            "name" : "Teams"
     },
     {
            "pattern" : "EP-\d{4}",
            "name" : "Case Reference"
     }
}
...
```

METHOD, PROCESSOR, AND SYSTEM FOR PROCESSING DATA PACKAGES

CROSS-REFERENCE TO RELATED APPLICATIONS

This application claims the benefit under 35 U.S.C. § 119(a) and 37 CFR § 1.55 to UK patent application no. 1914090.4, filed on Sep. 30, 2019, the entire content of which is incorporated herein by reference.

BACKGROUND OF THE INVENTION

Field of the Invention

The present disclosure relates to a method, processor, and system for processing data packages, more particularly determining incorrect actions by an originator of the data package.

Description of the Related Technology

When composing data packages for transmission by an originator, such as a sender, the originator may designate one or more recipients. Similarly, the originator may specify a mode of communication over which to transmit the data package. The designation of one or more recipients and the specification of a mode of communication is typically performed by the originator, and is therefore susceptible to human error, or not able to take account of system-based quality of service constraints. For example, the originator may designate the email address of an unintended recipient of an email message, or omit an intended recipient of the email address. Furthermore, the user may specify the data package is to be sent via email when the recipient(s) have requested communication occur via an instant messaging application.

Occurrences such as designation of an unintended recipient and/or selection of an inappropriate mode of communication can lead to the loss of sensitive confidential information, and/or unnecessary frustration for the parties involved in the communication. As such, this can lead to a loss of sensitive or confidential data.

SUMMARY

According to a first aspect of the present disclosure, there is provided a method for processing a data package to be sent using an application, by an originator of the data package to at least one recipient, the data package having an associated mode of communication, the method comprising the steps of analysing the data package to determine content of at least one field of the data package and generating a characteristic of the data package, wherein the characteristic is based on the mode of communication and the content of the at least one field of the data package. The method also comprises the step of determining an incorrect action by the originator of the data package based on the characteristic. This enables the determination of whether an originator of the data package has acted incorrectly based on features of the data package.

The mode of communication may comprise at least one of a method of communication and at least one channel associated with the method of communication. This enables detection of incorrect action if the originator of the data package were to send the data package using the correct method of communication, but via the wrong channel, for example as part of a different communication thread within an application.

Methods according to the first aspect may further comprise the step of determining a mode of communication, different from the associated mode of communication, from the generated characteristic and transmitting the data package via the determined mode of communication. This enables determination of an alternative mode of communication which may be more appropriate for transmitting the data package, and transmission of the data package using the alternative mode of communication.

The method may further comprise the step of obtaining a data set, the data set comprising at least one expression for generating the characteristic. This enables the expression to indicate a variety of incorrect actions of the originator of the data package.

The data set may be generated by at least one of a system administrator, and a machine learning system. This enables user/administrator configuration of the data set, and hence of the characteristics which determine incorrect actions of the originator of the data package.

Generating the characteristic may be further based on the at least one expression and the content of the at least one field of the data package, thereby enabling the content of the data package to be compared with the content of the expressions to determine incorrect action of the originator of the data package.

The at least one expression may be a regular expression that defines parameters, each parameter being indicative of a correct action by the originator of the data package. The expression may comprise keywords, definitions and/or recipient combination which are deemed to be incorrect actions of the originator of the data package.

Methods according to the first aspect may further comprise the step of determining whether the content of the at least one field of the data package corresponds to an alternative parameter in the regular expression and providing an indication of the alternative parameter to the originator of the data package. This enables the originator of the data package to be notified if there is an alternative parameter which would result in a correct action.

The field of the data package may comprise at least one of the recipients of the data package, a payload of the data package, a header of the data package; a footer of the data package; a subject of the data package; metadata associated with the data package and an attachment associated with the data package. The content of the at least one field may comprise a string of characters, the string of characters representative of at least one of a case reference; an object identifier; a project identifier; personally identifiable information; and financial information. This enables determination of incorrect action of the originator to be based on a large number of features of the data package.

The method may further comprise notifying the originator of the data package, when an incorrect action of the originator of the data package is determined. This enables a notification to be provided to the originator to indicate when an incorrect action has been undertaken.

The method may further comprise the step of transmitting the data package to the at least one recipient when an incorrect action of the originator of the data package is not determined. In this way the data package can be sent to the recipient when it is determined that the originator of the data package has acted correctly.

The at least one recipient may have a recipient identifier, which comprises at least one of an email address; a portion of an email address; a domain; a user name associated with the mode of communication; a telephone number; and a group identifier, the group identifier representative of a plurality of recipients. This enables the recipient to be identified using a variety of different characteristics dependent upon the method of communication.

According to a second aspect of the present disclosure, there is provided a processor for processing a data package to be sent using an application, by an originator of the data package to at least one recipient, the processor comprising an input module for receiving the data package, the data package having an associated mode of communication, and an analysis module for analysing the data package to determine content of at least one field of the data package. The processor also comprises a characteristic generation module for generating a characteristic of the data package, the characteristic being based on the mode of communication and the content of the at least one field of the data package, and a determination module for determining incorrect an action of the originator of the data package based on the characteristic.

Processors according to the second aspect may further comprise a communication mode determination module for determining a mode of communication, different from the associated mode of communication, from the generated characteristic and transmitting the data package via the determined mode of communication. This enables the determination of an alternative mode of communication which may be more appropriate for transmitting the data package and transmitting the data package using the alternative mode of communication.

According to a third aspect of the present disclosure, there is provided a system for processing a data package, the system comprising a processor, and a management device, wherein the management device determines at least one criterion for generating the characteristic. This enables an external device, such as a machine learning system to generate the characteristics for determining incorrect actions of the originator of a data package.

According to a fourth aspect of the present disclosure, there is provided a non-transitory computer-readable storage medium comprising a set of computer-readable instructions stored thereon which, when executed by at least one processor cause the processor to process a data package to be sent using an application, by an originator of the data package to at least one recipient, the data package having an associated mode of communication, the instructions comprising analysing the data package to determine content of at least one field of the data package, generating a characteristic of the data package, wherein the characteristic is based on the mode of communication and the content of the at least one field of the data package; and determining an incorrect action of the originator of the data package based on the characteristic. This ensures that data packages are sent using the most appropriate application based on their features, and the ability to determine whether a user has acted incorrectly based on the features.

BRIEF DESCRIPTION OF THE DRAWINGS

Further features and advantages of the disclosure will become apparent from the following description of preferred embodiments of the disclosure, given by way of example only, which is made with reference to the accompanying drawings, in which like reference numerals are used to denote like features.

DETAILED DESCRIPTION OF CERTAIN INVENTIVE EMBODIMENTS

Embodiments described herein relate to methods, systems and processors for processing a data package to be sent from an originator of the data package to at least one recipient, by determining incorrect actions by the originator. The originator of the data package may comprise a user of a sending device, or an application running on a device used for communicating with the one or more recipients.

Data packages may be sent between an originator of the data package and recipients on a data network. Due to the increased number of interconnected devices, such as smartphones, laptop computers, wearable devices, and desktop computers, users are able to send and receive data at various physical locations, over a plurality of different modes of communication, provided their device has an adequate connection to a data service using a suitable protocol, such as the Internet Protocol (IP) or via a telephone network. Accordingly, users may be able to send and/or receive data packages from various locations, at various time, using numerous devices and via different modes of communication. Being able to determine characteristics associated with a data package to be sent between such device can help identify incorrect actions, such as when an originator of the data package, such as a sender, selects an incorrect mode of communication.

Information relating to the originator and recipient of the data package, as well as other fields of the data package, may be used as the basis for determining incorrect actions, thereby helping to prevent the transmission of a data package to an undesired recipient or via an undesirable mode of communication. Being able to determine incorrect actions of the originator of the data package, quickly, is preferable to ensure that originator is not frustrated by unnecessary delays in sending the data package. This is especially important when an incorrect action is not detected. If the originator is frustrated or annoyed due to the amount of time, and lag or latency in determining incorrect actions, then this may lead them to deactivate, or simply never enable the system, and as such increase the risk of incorrect, or suboptimal, the transmission of a data package.

Figure 1:
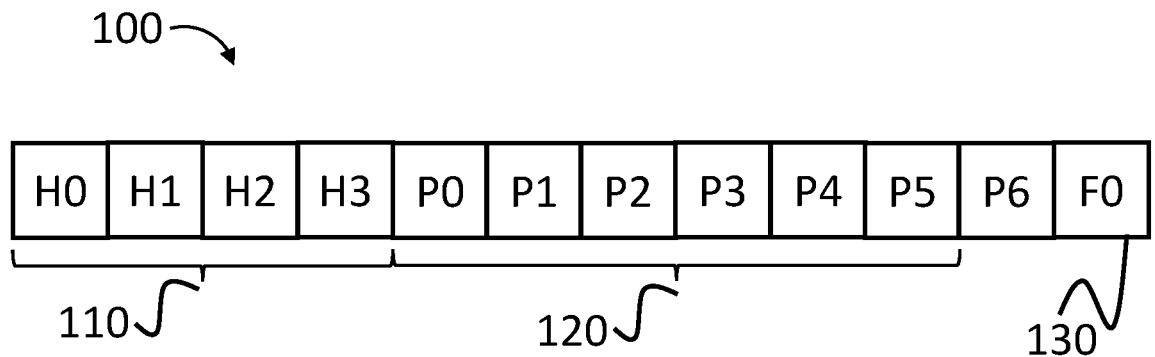
FIG. 1 is a schematic representation of an exemplary data package according to an embodiment.

FIG. 1 is a schematic representation of an exemplary data package 100 to which embodiments herein may be applied. The data package 100 comprises a header 110, payload data 120, and a footer 130, and may form part of a larger data file. The data package 100 may be an email, SMS message, Instant Message, multimedia file, a programme for execution on a computing device or any other suitable data. The data package 100 may be split into a number of smaller data portions H0 . . . H3; P0 . . . P6; F0. In some embodiments, each of these portions may represent individual bits of data for example. Whilst the data package 100 of FIG. 1 comprises eleven data portions, it will be appreciated that the data package 100 may comprise a larger or smaller number of data portions.

The header 110 of the data package 100 may comprise information regarding the payload data 120, for example the header may include data portions relating to the length of the data package 100, synchronization data, a package number, network protocols that define what type of information is contained in the payload data, a destination address, an originating address, and a location of the originator and/or recipient. It will be appreciated that other types of data portion and any combination of those data portions may be included in the header 110.

The payload 120 of the data package 100 may comprise data associated with the content to be transmitted from an originating device to one or more recipient devices. For example, the payload 120 comprises data associated with an email message or multimedia file. The payload 120 may comprise at least one data portion, which as mentioned above may be representative of individual bits of data. The data portions may also represent collections of individual bits, or even different data items. For example, the payload 120 of a data package may comprise data relating to an email, and a number of attachments to the email. As such, the payload 120 need not be representative of a single data item to be transmitted from an originating device to a recipient device. Similarly, the payload 120 may represent a portion of a data item. For example, where the data item to be transmitted is a large data file, such as a multimedia file, the data package 100 may represent only a portion of that data file. In such examples, the header 110 may be used to indicate the order of the data packages 100 making up the large data file.

The data package 100 may also comprise a footer 130 for verifying the contents of the data package 100 on transmission. For example, the footer 130 may comprise a data portion F0 used for error checking, such as a cyclic redundancy check or another similar method. As with the header 110 and payload 120, whilst the footer 130 is shown as a single data portion F0, it will be appreciated that the footer 130 may comprise more than a single data portion.

Figure 2:
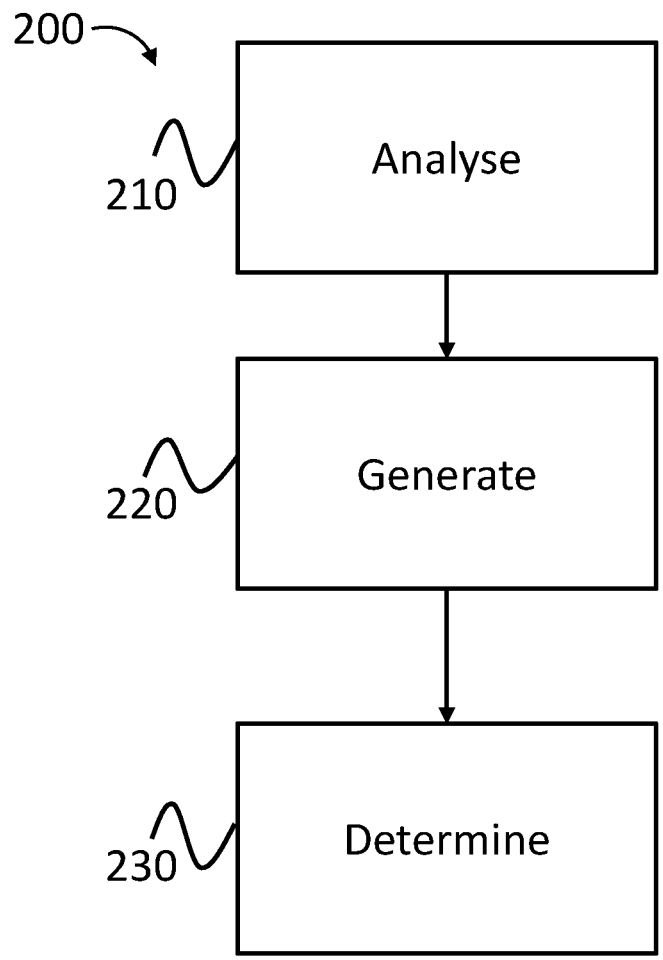
FIG. 2 is a flowchart showing a method for processing a data package to be sent by a sender to at least one recipient, according to a first embodiment.

FIG. 2 is a flowchart showing a method 200 for processing a data package, such as the data package 100 described above in relation to FIG. 1, according to a first embodiment. At step 210, a data package 100 is analysed by a processor, as will be described in further detail below with reference to FIG. 5. The data package 100 is analysed to determine the content of one or more fields of the data package 110. The one or more fields of the data package 100 may be represented by at least one of the data portions H0 . . . H3; P0 . . . P6; F0 making up the data package 100. For example, one field of the data package 100 may be representative of a recipient or multiple recipients of the data package 100. This information may be contained within header 110 of the data package and as such may be represented by one or more of H0, H1, H2, or H3. In some embodiments, such as when the data package 100 is an email, the data package 100 may be addressed to a plurality of recipients, as such the header portion 110 (or any other portion of the data package 100) may include data identifying the plurality of recipients. This data may comprise an email address, a portion of an email address, a domain, a user name associated with the mode of communication, or a telephone number, where the recipient identifier is stored within the header 110 of the data package 100. In some examples, a group of recipients may be represented by a group identifier, whereby each member of the group has its own identifier and an associated group identifier such that the originator of the data package 100 needs only refer to the group identifier to send the data package 100 to all members of the group.

The content of other fields of the data package 100 may also be analysed, for example the payload 120 of the data package 100, other content in the header 110 or footer 130 of the data package 100, a subject associated with the data package 100, and content of any attachments associated with the data package 100 may be analysed as will be described in further detail below with reference to FIG. 4.

Once the analysis has been undertaken and the content of at least one field of the data package 100 has been determined, at step 220, a characteristic is generated. The characteristic is based on the mode of communication of the data package 100, and the content of the at least one field of the data package 100. The originator of the data package 100 may indicate the mode of communication for sending the data package 100 to the at least one recipient. Alternatively, the structure of the data package 100 may define the mode of communication. The mode of communication may comprise a method of communication, the method of communication being indicative of a particular protocol, or application, such as email, text message, phone call, instant message, or any other suitable method. In some embodiments, the method of communication may also indicate whether the data package 100 should be encrypted, or otherwise sent via a secure means.

In some examples, the mode of communication may further comprise a channel associated with one or more of the methods of communication. For example, an instant messaging application may enable users to define groups of recipients such as a management group, an employee group, or a company-wide group, amongst others. As such, the mode of communication may not only indicate the application through which to send the data package but a channel associated with that application. In such an example, the characteristic can be used to not only detect whether an originator is using the correct application to send the data package 100 but also detect whether the originator is using the correct channel, thereby preventing erroneous transmission to unintended recipients, even if the correct method of communication is being used. To achieve this, in some embodiments, the method may be implemented as software in the form of a plug-in installed separately from the application used to transmit the data package 100. In further embodiments, the method may be implemented as part of a web-based application, which is accessed via a web browser configured on a device used by the originator of the data package 100. In such embodiments, the web-based application may be hosted on a remote server and accessed over a data network or hosted locally at the device of the originator of the data package 100.

The characteristic generated at step 220 can, therefore, be based on the content of the at least one field of the data package 100 determined at step 210.

Once the characteristic has been generated, the method 200 progresses to step 230, where it is determined whether the originator has correctly or mistakenly defined the data package 100. This occurs before transmission of the data package 100 to the at least one recipient.

The determination of incorrect actions is based on the characteristic generated at step 220. For example, where the analysis of the data package 100 indicates that the data package 100 is to be sent to a particular recipient, and that recipient has requested all communication occurs via an instant message application, if the originator attempts to send the data package 100 via email, at step 230, incorrect behaviour will be determined since the originator has mistakenly defined the data package 100, in this case, due to specifying an incorrect mode of communication. It will be appreciated that other portions of the data package 100 may be used when generating the characteristic to determine an incorrect action, for example, if the payload 120 of the data package 100 contains a particular term, and all communication regarding that term must be sent by a particular mode of communication. In such an example, if the data package 100 is not sent by that mode of communication it will be determined that, if sent, the data package 100 will have been mistakenly defined due to the wrong mode of communication being specified.

In one embodiment, where it is determined that the data package 100 has been mistakenly defined, for example, by specifying a non-permitted mode of communication, the method may determine that a mode of communication, different to the mode of communication specified is more appropriate. Then, without notification to the originator of the data package, the method may involve sending the data package 100 to the one or more recipients via the more appropriate mode of communication. One such example may include where the field of the data package 100 is the body of a message, and the content of the body of the message is less than a predetermined number of characters, and the mode of communication specified is email, then incorrect behaviour may be determined, based on the fact that a data package 100 with a body comprising a number of characters below the predetermined threshold should be sent by instant message. In this case, the method may, without prompting the originator, automatically transmit the message via instant message instead of email.

In yet another example, the feature of the data package 100 may be indicative of a desired quality of service (QoS) and/or desired security level, whereby the characteristic is generated based on the selected mode of communication and the QoS and/or security level provided by said mode of communication. In such an example, where a specified mode of communication provides a particular QoS, the QoS being below the desired QoS, an alternative, but equivalent mode of communication may be automatically selected. Similarly, if the alternative, but equivalent, mode of communication provides an increased QoS over the specified mode of communication, the alternative mode of communication may be selected automatically regardless of whether the specified mode of communication exceeds the desired QoS. One such example may be where the user-selected mode of communication is Skype® for a voice over internet protocol (VoIP) call, and Microsoft Teams® is also available and is determined to provide an increased QoS for VoIP calls. This ensures that the originator and recipient(s) of the data package 100 have the best experience during transmission. It will be appreciated that this may be used for the transmission of other types of data package 100, where the alternative mode of communication is based on the bandwidth available to the mode of communication.

In another example, where the feature of the data package 100 is indicative of a security level, the characteristic may be generated based on one or more features provided by the recipient domain, such as the ability to receive data packages using a secure mode of transmission, such as transport layer security (TLS). Therefore, if the security level of the data package 100 is of a predetermined level, such as low or medium, and the recipient's domain can receive data packages using a secure mode, the mode of communication may not include encrypting the data package. Else, if the security level is above a predetermined level, then the mode of communication should specify that the data package is to be encrypted prior to transmission to the recipient, regardless of the ability of the recipient domain to receive data packages transmitted using a secure mode.

In yet a further embodiment, the generated characteristic may be based on whether previous data package transmissions of similar data packages (such as data packages sent to the same recipient, or comprising the same feature) were sent via a particular mode of communication, such as via a particular application. In such an embodiment, the previous transmissions may be used to indicate an incorrect action, and automatically specify an alternative mode of communication, where the alternative mode of communication is the particular mode of communication of the previous transmissions.

In embodiments in which a mode of communication specified by the data package 100 results in a determination of incorrect actions, and an alternative mode of communication is preferable, an application programming interface (API) associated with an operating system of the device associated with the originator of the data package 100 may be invoked. The API may determine applications, representative of alternative modes of communication for transmitting the data package 100 to a recipient. The API may further determine whether an application is currently operational and if not may initiate the application on the device via one or more API calls. For example, a uniform resource identifier (URI) within the plug-in to identify a particular application, and upon calling the API, used to either switch focus to the application. Switching focus to the application may involve initiating the application when it is not already running. Further API calls, using further URIs may be used to initiate data package 100 transmission, and obtain features relating to the application, such as a QoS metric used for determining whether the application will provide the desired QoS in comparison to an alternative application. As mentioned above, the plug-in may form part of an application, such as an email, instant messaging, or VOIP client, or maybe installed separately from the application such as a standalone application on the operating system of a device associated with the originator of the data package 100.

Figure 3:
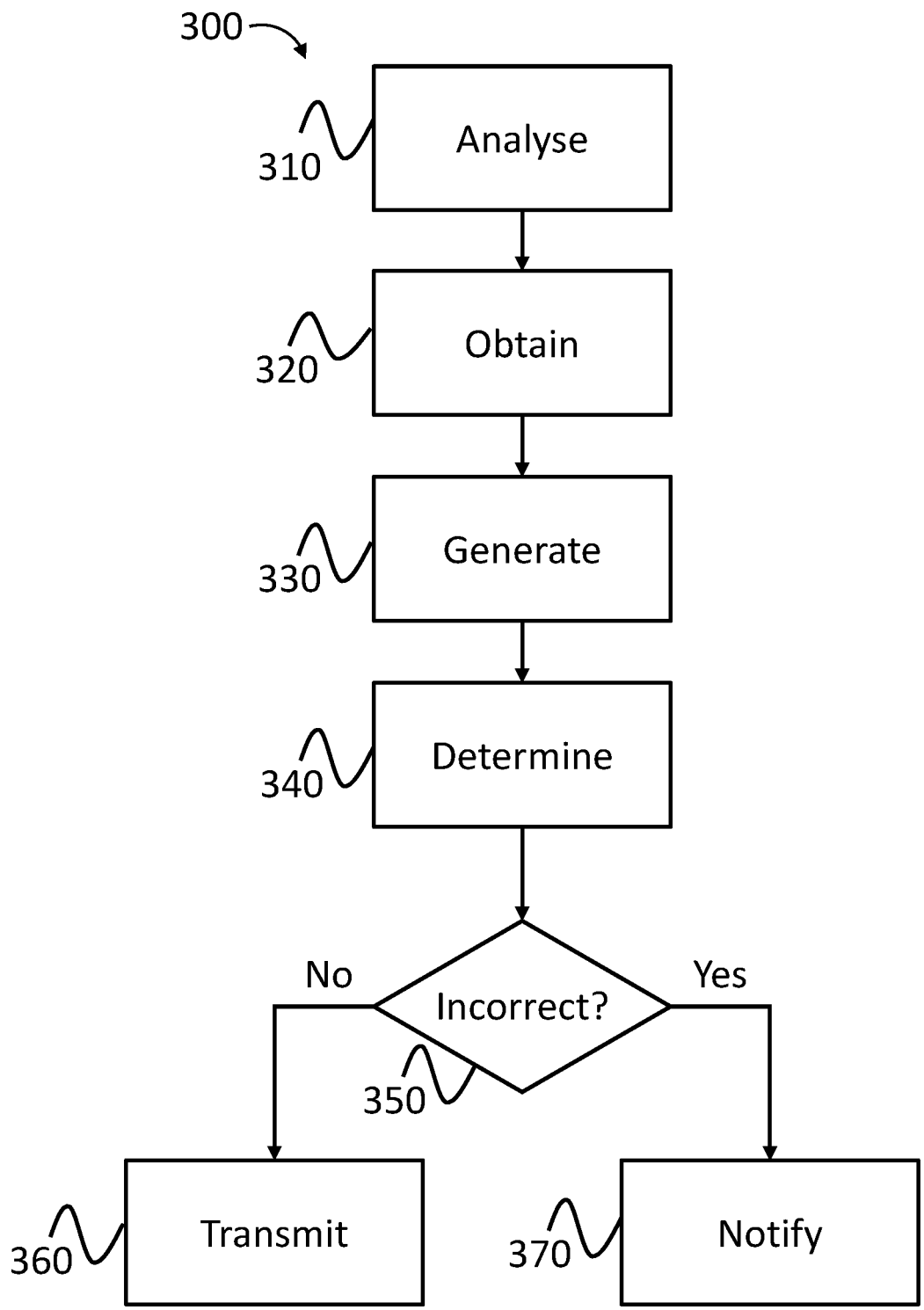
FIG. 3 is a flowchart showing a method for processing a data package to be sent by a sender to at least one recipient, according to a second embodiment.

FIG. 3 is a flowchart showing a method 300 for processing a data package, such as the data package described above in relation to FIG. 1, according to a further embodiment. At step 310, a data package 100 is analysed by a processor, as described previously in relation to FIG. 2. Once the analysis has been undertaken, the method 300 progresses to step 320, where one or more data sets are obtained. The data sets may be obtained from a memory associated with a system as will be described below in relation to FIG. 6, or alternatively may be obtained from remote storage, such as via a network such as the Internet. The data set may provide indications of correct actions, and may comprise a number of databases, records, or other suitable data structure, for storing such indications. In one example, the data set may comprise one or more regular expressions, as will be detailed below in relation to FIG. 4.

Once the data set has been obtained, method 300 progresses to step 330, where a characteristic of the data package 100 is generated. The characteristic, as described above in relation to FIG. 2, may be generated based on the mode of communication and the content of at least one field of the data package 100. In other embodiments, the characteristic may be generated based on the content of the field of the data package in combination with the content of the data set. For example, the data set, as will be described below, may comprise information indicating a correct action, such as when sending a data package 100 comprising data relating to a particular "City", this should be sent to a particular recipient.

At step 340, it is determined whether the data package 100 has been defined in error. This occurs before the actual transmission of the data package to the one or more recipients. Continuing the example above, if the payload 120 of the data package 100, such as the body of an email communication, contains a reference to the particular "City", but is addressed to a second recipient, the method 300 at step 340 determines the data package has been defined in error. In such an example, at item 350, the no branch is taken, and the originator of the data package 100 is notified of the error at item 370, and the data package 100 is not transmitted. At item 370, when it is determined that there has been incorrect behaviour, a notification may be provided to the originator. The notification may comprise a user interface element presented on a display of a device, such as a device used by the originator of the data package 100. This notification may comprise an indication as to what was determined to be incorrect action, and in some embodiments, where the data set indicates that a modification to the data package 100 would result in a correct action, the originator may be notified.

When the data set indicates that a modification to the data package 100 would result in a transmissible data package 100, the notification provided may include information enabling an originator to modify the data package 100. For example, where the data set indicates that the payload 120 of a data package 100 containing a particular term, such as a location, is allowed to be sent to recipient A, B, and C but the data package is, in fact, addressed to recipient D. In this case, the notification may include an indication that if the data package 100 was to be adjusted such that the recipient is any of A, B or C, either alone or in combination then transmitting the data package 100 would be permissible.

Returning to step 350, when it is determined that the data package 100 satisfies the one or more expressions in the data set, the data package 100 is transmitted to the one or more recipients without prompting and/or notifying the originator.

Figures 4, 5:
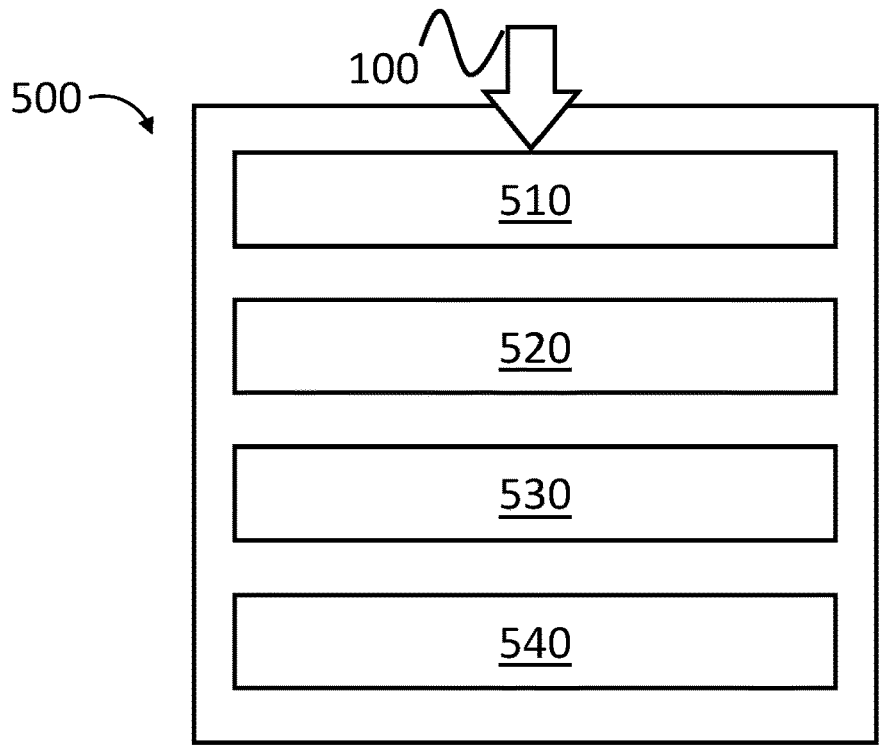
FIG. 4 is an exemplary representation of a data set for use in processing a data package such as the data package of FIG. 1.
FIG. 5 is a schematic representation of a processor according to an embodiment.

FIG. 4 is an exemplary representation of a data set 400 for use in processing a data package such as the data package of FIG. 1. The data set 400 may be represented as a regular expression comprising a number of parameters, as shown in FIG. 4; however, it will be appreciated that other data formats may be used, for example, a database, or XML schema. The data set 400 comprises parameters that can be used to determine appropriate actions for a given communication. For example, as shown in FIG. 4, messages sent to a recipient with identifier "a@b.com" may contain the references to "London", "Sheffield", or "Toronto", they may refer to "Patents", "API" or "Client", and they may relate to the case reference "EP-\{4}" where "\d{4}" refers to a string of 4 digits, such as "EP-1234". It will be appreciated that the data set 400 may comprise other allowable terms which may be based on an analysis of the payload 130 of the data package 100. Such terms may be represented as a string of characters in the payload 130 and may include a recipient identifier indicating when data packages should be copied to multiple recipients, a case reference, a project identifier, personally identifiable information, and/or financial information. It will be appreciated that the content of the at least one field of the data package may contain other strings of characters useful for identifying correct and incorrect actions, other than those described above. It will be appreciated that any identifier which has a defined structure that can be identified through its characteristics may be used within the data set.

As mentioned above in relation to FIG. 3, the data set 400 is used to generate a characteristic of a data package 100, which in turn may be used to determine incorrect actions. For example, if reference to one or more of the "names" parameters are present within the data package 100, but the reference does not match the "pattern" of allowable parameters, such as a data package 100 which refers to "Leeds", the characteristic generated will indicate incorrect behaviour. In some embodiments, the originator may be notified and provided with an alternative allowable "City" such as "Sheffield".

In another example, the data set 400 may be used to determine whether a correct mode of communication has been specified. For example, the data set may specify that data packages 100 relating to a particular project or case identifier must be sent using a particular application, for example using Microsoft® Teams. Furthermore, the data set 400 may specify that the data package 100 must be sent using a particular channel in Microsoft® Teams, such as an HR channel since the data package 100 relates to personally identifiable information. If at step 330 of method 300 it is determined that a data package 100 specifies email as the mode of communication, then this in combination with the data set 400, results in the generation of a characteristic which indicates incorrect behaviour. The originator of the data package 100 may be notified, or in some embodiments, where there is only one possible modification to the data package 100 available results in correct behaviour, the modification may be made without intervention.

One further example, where the data package 100 may be modified without intervention, is where the data set 400 indicates that data packages 100 sent to a particular recipient should be encrypted. In such an example, if the data package 100 has not been encrypted prior to sending, which would be indicative of incorrect behaviour, the data package 100 may be automatically encrypted prior to transmission.

In some embodiments, the data set 400 may be generated and/or otherwise updated or managed by a system administrator. The system administrator may be company security personnel or an IT manager responsible for information security. Additionally, in some examples, the data set 400 may be generated and/or otherwise updated or managed by a management system, which may be a machine learning system, such as the one described in UK Patent Application Nos. GB1901736.7, GB1901737.5, and GB1901738.3. For example, the machine learning system may comprise one or more machine learning functions, which may be used to analyse previous interactions between an originator of a data package 100 and the one or more recipients. Based on this analysis, risk scores may be determined and a data set generated for use in determining incorrect behaviour, or actions. The machine learning functions may use one or more pre-calculated models associated with particular actions as well as other information related to the data package 100, such as the internet protocol (IP) addresses of users—both originators of the data package 100 and recipients—or, where the management system does not comprise data associated with a particular recipient, data relating to other users on the same domain, common recipients for a particular data packages 100, the locations that the originator usually transmits data packages from, device information, software version, client information e.g. browser type, and content metadata—such as order of keystrokes and the speed of keystrokes.

This information may be used to generate a data set, such as data set 400 which is used during the generation of the characteristic for determining incorrect actions. The machine learning system may manage and update the data set as appropriate based on subsequent data package 100 transmissions, and used to determine remedial actions to result in a transmissible data package 100 when an incorrect action has been detected.

FIG. 5 is a schematic representation of a processor 500 according to an embodiment. The processor 500 is arranged to receive a data package 100, such as the data package described above in relation to FIG. 1. The data package 100 may be received at an input module 510, via an internal bus (not shown) associated with a system associated with the processor, as will be described below in relation to FIG. 6. In another embodiment, the data package 100 may be received via a data network, such that the data package 100 is sent from an originating device to a remote device comprising the processor. The remote device being arranged to process the data package 100 prior to transmission to one or more recipients. In such an example, the sending device, the remote device, and devices associated with the one or more recipients may be connected to the same data network by a wired or wireless link. The input module 510 may receive the data package 100, for transmission from an originating device to a recipient device, in another example, the input module 510 may receive the data package 100 in real-time as the data package 100 is generated at the originating device. In such an example, the processor 500 is able to provide a determination of incorrect behaviour in real-time enabling the originator of the data package 100 to correct their behaviour prior to transmission.

Upon receipt of the data package 100 at the input module 510, an analysis module 520 analyses the data package 100 to determine the content of one or more fields of the data package 100, such as content within the payload data 120, or header data 110 of the data package 100. The analysis to determine the content of one or more fields of the data package 110 is then used by a characteristic generation module 530 as the basis of generating a characteristic associated with the data package 100 in combination with the mode of communication. The characteristic generated by the characteristic generation module 530 is indicative of incorrect behaviour, and as described above in relation to FIGS. 2 and 3, may be used to determine incorrect behaviour, such as by indicating when an incorrect mode of communication has been specified. This determination is undertaken by a determination module 540 which receives the characteristic from the characteristic generation module 530.

In some examples, the input module 510 may also receive a data set from storage (not shown) associated with the processor 500, or from remote storage accessed via a data network. The data set, such as the data set 400 described above in relation to FIG. 4, may be used by the characteristic generation module 530 to generate a characteristic not only based on the content of the fields of the data package 100 and the mode of communication, but also the content of the fields of the data package 100 and one or more parameters of the data set 400 indicative of correct behaviour.

The processor 500 may also comprise a transmission module for transmitting the data package 100 to one or more recipients if no incorrect behaviour is determined.

In yet a further embodiment, the processor 500 may comprise a notification module (not shown) for notifying the originator of the data package 100 when incorrect behaviour has been determined. The notification module may in some examples provide an indication as to correct behaviour which would result in the transmission of the data package 100. Such a notification may comprise the addition/removal of a recipient, based on allowable parameters within the data set 400. However, it will be appreciated that other modifications may be suggested to the originator of the data package 100. In yet a further example, the processor 500 may make the modification to the data package 100 without user intervention, and subsequently, transmit it to one or more recipients via the transmission module.

Figure 6:
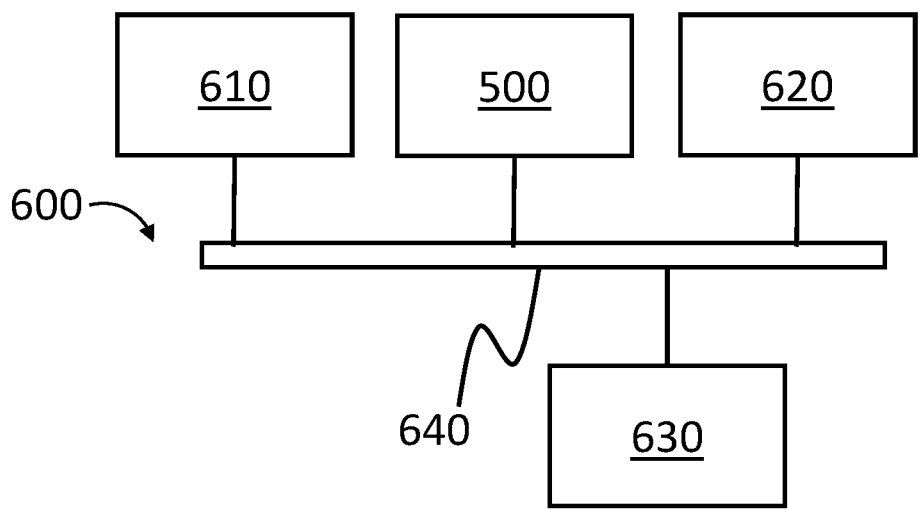
FIG. 6 is a schematic representation of an exemplary system according to an embodiment.

FIG. 6 is a schematic representation of an exemplary system 600 according to an embodiment. The system 600 comprises a processor, such as the processor 500 described above in relation to FIG. 5. The processor 500 is arranged to receive a data package 100. The data package 100 may be obtained from an input device 610 associated with the system 600. The input device 610, for example, maybe a keyboard, and the data package 100 representative of a message for sending from an originating device to a recipient device, by a user of the system 600. In another example, where the system 600 is a server arranged to process data packages 100 generated by a remote input device, the data package 100 may be received via a data network, via a suitable protocol, such as the Internet Protocol (IP). In such an example, a connection to the data network may be achieved via a wired or wireless connection.

The system 600 may also comprise storage 620 for storing one or more data sets, such as data set 400 for use by the processor 500 when generating the characteristic associated with the data package 100. The storage 620 may be a random-access memory (RAM) such as DDR-SDRAM (double data rate synchronous dynamic random-access memory). In other examples, the storage 620 may be or include non-volatile memory such as Read-Only Memory (ROM) or a solid-state drive (SSD) such as Flash memory. The storage 620 in examples may include further storage devices, for example magnetic, optical or tape media, compact disc (CD), digital versatile disc (DVD) or other data storage media. The storage 620 may be removable or non-removable from the system 600. In some embodiments, the storage 620 may be external to the system 600. That is that the storage 610 may be remote, such as cloud storage, accessed via the same or different data network over which the data package 100 may be received.

In some embodiments, the data set 400 may be generated by a management device 630. The management device 630 may be arranged to receive input from a user, such as a system administrator. The input provided to the management device 630 may be representative of correct/allowable behaviour. In yet a further example, the management device 630 may comprise a machine learning processor, which may not only receive input from a system administrator but may also receive input in the form of previous transmissions and whether they were indicative of correct or incorrect behaviour. In some examples, the management device 630 may only receive previous transmission data. The previous transmission data may be stored in the storage 620 associated with the system 600 or may be stored remotely to the system 600 and accessed via a data network. The management device 630 may be a machine learning system, such as the one described above.

Furthermore, the management device 630 may be remote, and not directly connected to the system 600 but accessed via a data network. The data set 400 generated by the management device 630 may then be stored in the storage 620 of the system or stored remoted for later access by the processor 500. Alternatively, the data set 400 may be provided directly to the processor 500 for use when generating the characteristic of the data package 500.

It will be appreciated that at least parts of the methods discussed above with reference to FIGS. 2 and 3 are typically embodied as a computer system that executes computer-readable instructions. The computer-readable instructions may be in the form of software, such as an application arranged to run on the computer system. One such computer system may be the system 600 described above with reference to FIG. 6. As an example, an embodiment of a computer program product includes a computer useable storage medium to store a computer-readable program that, when executed on a computing device, causes the computing device to perform operations, as described above. Furthermore, embodiments of the disclosure can be embodied in the form of a computer program product accessible from a computer-usable, or computer-readable medium providing code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-usable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disc. Current examples of optical discs include a compact disc with read-only memory (CD-ROM), a compact disc with read/write (CD-R/W), and a digital versatile disc (DVD).

Figure 7:
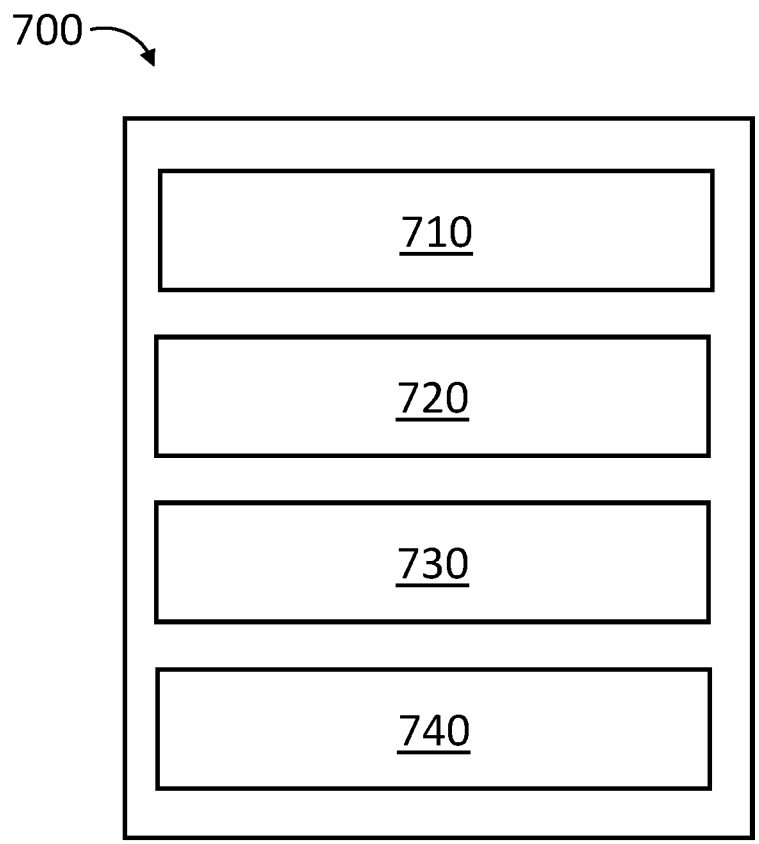
FIG. 7 is a schematic diagram of an exemplary computer according to an embodiment.

The originating device, recipient device(s), and management device described above with reference to FIGS. 2-6 are typically embodied as a computer system that executes computer-readable instructions, one such example is the computer system 700 described in relation to FIG. 7. FIG. 7 depicts schematically an example of a suitable computer 700 that includes a processor 710, a memory 720, a storage device 730, and a network interface 740. The processor 810 may include a multifunction processor and/or an application-specific processor, examples of which include the PowerPC™ family of processors by IBM® and the x86 and x86-64 family of processors by Intel®. The processor 710 may further comprise the features and functionality of the processor 500 described above in relation to FIG. 5. The memory 720 within the computer 700 is typically RAM and the storage device 730 is typically a large capacity permanent storage device, such as a magnetic hard disc drive or solid-state memory device. The network interface 740 enables communication with other computers within a network using a suitable protocol, such as the Internet Protocol (IP), and the processor 710 executes computer-readable instructions stored in the storage 730 to implement embodiments of the disclosure as described above.

It will be appreciated that references to data package used throughout the specification may relate to any data for transfer between an originator of the data package and a recipient. For example, the data package may relate to data such as an email, SMS, or MMS message, a multimedia file, or call data via a VOIP telephony system or cellular system telephony.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method for processing a data package to be sent using an application, by an originator of the data package to at least one recipient, the data package having an associated mode of communication, the method comprising the steps of:
   analysing the data package to determine content of at least one field of the data package;
   obtaining a data set generated by at least one of: a system administrator; and a machine learning system, wherein the data set comprises at least one expression;
   generating a characteristic of the data package, wherein the characteristic is based on the mode of communication, the content of the at least one field of the data package, and the data set;
   determining an incorrect action by the originator of the data package based on the characteristic;
   notifying the originator of the data package, when an incorrect action of the originator of the data package is determined; and
   transmitting the data package to the at least one recipient, when an incorrect action of the originator of the data package is not determined.

2. The method according to claim 1, wherein the mode of communication comprises at least one of a method of communication and at least one channel associated with the method of communication.

3. The method according to claim 1, further comprising the step of determining a mode of communication, different from the associated mode of communication, from the generated characteristic and transmitting the data package via the determined mode of communication.

4. The method according to claim 1, wherein the step of generating the characteristic is further based on the at least one expression and the content of the at least one field of the data package.

5. The method according to claim 1, wherein the at least one expression is a regular expression, the regular expression defining parameters, each parameter being indicative of a correct action by the originator of the data package.

6. The method according to claim 5, further comprising the step of determining whether the content of the at least one field of the data package corresponds to an alternative parameter in the regular expression, and providing an indication of the alternative parameter to the originator of the data package.

7. The method according to claim 1, wherein the field of the data package comprises at least one of:
   the at least one recipient of the data package;
   a payload of the data package;
   a header of the data package;
   a footer of the data package;
   a subject of the data package;
   metadata associated with the data package; and
   an attachment associated with the data package.

8. The method according to claim 1, wherein the content of the at least one field comprises a string of characters, the string of characters representative of at least one of:
- a case reference;
- an object identifier;
- a project identifier;
- personally identifiable information; and
- financial information.

9. The method according to claim 1, wherein the at least one recipient has a recipient identifier, the recipient identifier comprising at least one of:
- an email address;
- a portion of an email address;
- a domain;
- a user name associated with the mode of communication;
- a telephone number; and
- a group identifier, the group identifier representative of a plurality of recipients.

10. A processor for processing a data package to be sent using an application, by an originator of the data package to at least one recipient, the processor comprising:
- an input module for receiving the data package, the data package having an associated mode of communication, and a data set comprising at least one expression, the data set generated by at least one of: a system administrator; and a machine learning system;
- an analysis module for analysing the data package to determine content of at least one field of the data package;
- a characteristic generation module for generating a characteristic of the data package, the characteristic being based on the mode of communication, the content of the at least one field of the data package and the data set;
- a determination module for determining incorrect an action of the originator of the data package based on the characteristic;
- a notification module for notifying the originator of the data package when an incorrect action of the originator of the data package is determined; and
- a transmission module for transmitting the data package from the originator of the data package to the at least one recipient when an incorrect action of the originator of the data package is not determined.

11. The processor according to claim 10, further comprising a communication mode determination module for determining a mode of communication, different from the associated mode of communication, from the generated characteristic and transmitting the data package via the determined mode of communication.

12. A non-transitory computer-readable storage medium comprising a set of computer-readable instructions stored thereon which, when executed by at least one processor cause the processor to process a data package to be sent using an application, by an originator of the data package to at least one recipient, the data package having an associated mode of communication, the instructions comprising:
- analysing the data package to determine content of at least one field of the data package;
- obtaining a data set generated by at least one of: a system administrator; and a machine learning system, wherein the data set comprises at least one expression;
- generating a characteristic of the data package, wherein the characteristic is based on the mode of communication, the content of the at least one field of the data package, and the data set;
- determining an incorrect action of the originator of the data package based on the characteristic;
- notifying the originator of the data package, when an incorrect action of the originator of the data package is determined, and
- transmitting the data package to the at least one recipient, when an incorrect action of the originator of the data package is not determined.

* * * * *